United States Patent
Schroeder et al.

(10) Patent No.: US 10,683,963 B2
(45) Date of Patent: Jun. 16, 2020

(54) CONTAINER MOUNTING ASSEMBLY

(71) Applicant: Ferno-Washington, Inc., Wilmington, OH (US)

(72) Inventors: Timothy Paul Schroeder, Mason, OH (US); Charles Delbert Drake, Goshen, IN (US); Eyal Bar-Erez, Kfar Monash (IL)

(73) Assignee: Ferno-Washington, Inc., Wilmington, OH (US)

( * ) Notice: Subject to any disclaimer, the term of this patent is extended or adjusted under 35 U.S.C. 154(b) by 0 days.

(21) Appl. No.: 15/565,612

(22) PCT Filed: Apr. 21, 2016

(86) PCT No.: PCT/US2016/028618
§ 371 (c)(1),
(2) Date: Oct. 10, 2017

(87) PCT Pub. No.: WO2016/172327
PCT Pub. Date: Oct. 27, 2016

(65) Prior Publication Data
US 2018/0073676 A1 Mar. 15, 2018

Related U.S. Application Data

(60) Provisional application No. 62/150,660, filed on Apr. 21, 2015.

(51) Int. Cl.
*F16M 13/02* (2006.01)
*B60R 11/00* (2006.01)
(Continued)

(52) U.S. Cl.
CPC ........... *F16M 13/02* (2013.01); *B60P 7/0815* (2013.01); *B60R 11/00* (2013.01); *A61G 3/00* (2013.01);
(Continued)

(58) Field of Classification Search
CPC ..... F16M 13/02; F16M 11/041; B60P 7/0815; B60R 11/00; B60R 2011/0003;
(Continued)

(56) References Cited

U.S. PATENT DOCUMENTS 2,920,767 A * 1/1960 Halip .................... A47F 5/0815
211/175
3,605,637 A 9/1971 Prete, Jr.
(Continued)

FOREIGN PATENT DOCUMENTS

DE 202006020143 11/2007
EP 2206623 A1 7/2010
(Continued)

OTHER PUBLICATIONS

International Search Report and Written Opinion dated Mar. 3, 2015 for PCT/US2014/050288 Filed Aug. 8, 2014, pp. 1-8.
(Continued)

*Primary Examiner* — Christopher Garft
(74) *Attorney, Agent, or Firm* — Dinsmore & Shohl LLP

(57) ABSTRACT

Container mounting assemblies are disclosed. According to one embodiment, a container mounting assembly includes mounting plates (31, 33), track engagement members outwardly extending from the track engagement surface, mounting receptacles (20, 20') spaced and outwardly extending from the container mounting surface (3), and a retention locking member (40) near at least one mounting receptacles. Each mounting plate has a track engagement surface and a container mounting surface opposite the track engagement surface. The track engagement members can engage one or more track slots of a track member. Each mounting receptacle has at least one vertical slot (17) for receiving an insert of a container. The retention locking member is configured to secure the container to the container mounting surface.

19 Claims, 14 Drawing Sheets

(51) Int. Cl.
*B60P 7/08* (2006.01)
*A61G 3/00* (2006.01)

(52) U.S. Cl.
CPC ............... *B60R 2011/0003* (2013.01); *B60R 2011/0073* (2013.01); *B60R 2011/0075* (2013.01)

(58) Field of Classification Search
CPC ..... B60R 2011/0073; B60R 2011/0075; B60R 2011/0059; B60R 2011/0052; A61G 3/00
USPC ............... 248/420, 220.21, 221.12, 220.31, 248/220.41–220.43, 223.41–223.51, 248/224.51–224.61, 223.21, 225.11, 248/499–50, 503.1; 410/104–105; 211/94.01
See application file for complete search history.

(56) References Cited

U.S. PATENT DOCUMENTS

| | | | |
|---|---|---|---|
| 4,256,424 A | 3/1981 | Knox et al. | |
| 4,687,094 A * | 8/1987 | Allsop | A47F 5/0823 206/45.26 |
| 4,708,311 A * | 11/1987 | Clausen | A47F 5/0846 211/87.01 |
| 5,083,668 A * | 1/1992 | Bushey | A47F 5/0815 160/135 |
| 5,674,033 A * | 10/1997 | Ruegg | B60P 3/079 410/101 |
| 6,824,028 B2 * | 11/2004 | Mutai | A45F 5/02 224/269 |
| 6,945,414 B1 | 9/2005 | Stevens et al. | |
| 7,261,264 B2 * | 8/2007 | Moran | A01K 1/0356 24/573.11 |
| 7,392,912 B2 * | 7/2008 | Zandt | A47F 5/0823 211/57.1 |
| 8,613,564 B2 * | 12/2013 | Busch | F16B 21/09 403/322.1 |
| 2006/0243766 A1 | 11/2006 | Lan | |
| 2007/0094955 A1 * | 5/2007 | Safford | E04B 2/885 52/204.5 |
| 2010/0307649 A1 | 12/2010 | Santos Dominguez | |
| 2013/0081233 A1 | 4/2013 | Lu | |
| 2013/0193179 A1 | 8/2013 | Davidson | |
| 2014/0374564 A1 | 12/2014 | Schroeder et al. | |

FOREIGN PATENT DOCUMENTS

| | | |
|---|---|---|
| EP | 2614804 A1 | 7/2013 |
| WO | 2016010566 A1 | 1/2016 |

OTHER PUBLICATIONS

International Preliminary Report dated Jan. 24, 2017 for PCT/US2014/050288 Filed Aug. 8, 2014. pp. 1-5.
International Search Report and Written Opinion dated Mar. 27, 2015 for PCT/US2014/050392 Filed Aug. 8, 2014. pp. 1-18.
International Patentability Report dated Jan. 24, 2017 for PCT/US2014/050392 Filed Jan. 24, 2017. pp. 1-12.
International Search Report and Written Opinion dated Jul. 1, 2016 for PCT/US2016/028618 Filed Apr. 21, 2016. pp. 1-11.

* cited by examiner

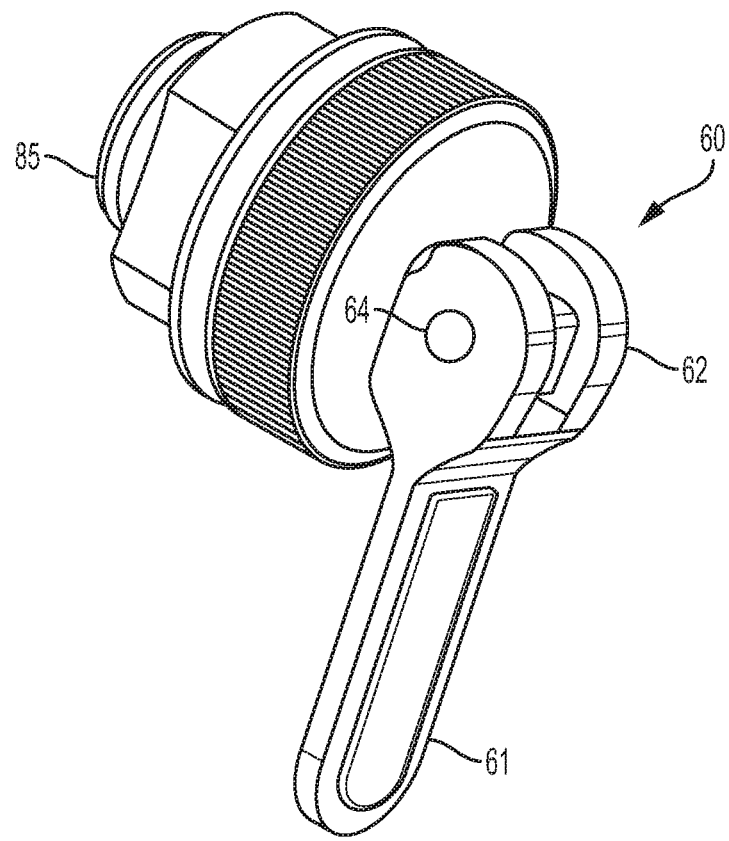
FIG. 13A
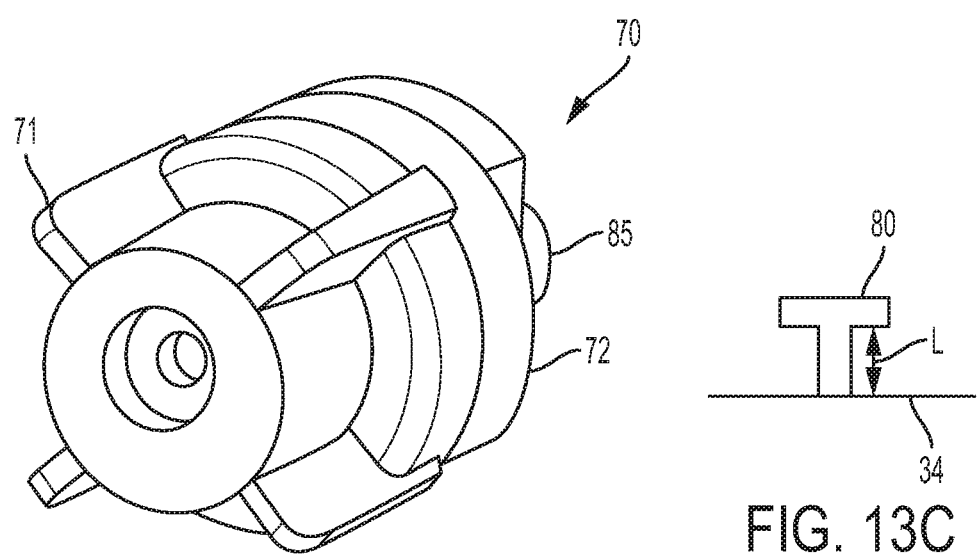
FIG. 13B
FIG. 13C

CONTAINER MOUNTING ASSEMBLY

CROSS REFERENCE TO RELATED APPLICATIONS

The present application hereby claims the benefit of Provisional U.S. application Ser. No. 62/150,660 filed Apr. 21, 2015.

TECHNICAL FIELD

The present specification generally relates to a container mounting assembly for use in various configurations with a vehicle or a structure and, more specifically, a crash-ready, portable, container mount that is used with an equipment mounting system in an ambulance.

BACKGROUND

Many supplies used in mobile applications are organized in containers that are carried from a supply area to an area of use. The use of containers to carry and secure supplies is especially pertinent in ambulatory services, where space, speed and efficiency are required. Many times, the design techniques do not overcome the deficiencies of using the furniture in a space limited environment, such as in mobile applications. Furthermore, the containers are normally rigidly attached in mobile applications which may not allow the supplies stored in the containers to be used in another location. Therefore, the requirements for the securing fasteners of the containers are increased in mobile applications over static applications. Furthermore, the occupants of the vehicle may wish to relocate the containers without the need for tools. Therefore a need exists, especially in ambulatory services, for a container mounting system on an ambulance that can be removably coupled to the ambulance, and in turn may be removably coupled to by a container that holds supplies.

The container mounting assembly is crash-ready as defined herein. In other words, the container mounting assembly is designed to survive and withstand inertial and impact forces normally occurring during a crash and still retain functionality. As used throughout, "crash-ready" means that an assembly, equipment, mount, track member, fastening devices, or structure may be configured to survive an inertial force, an impact, a vehicle crash, or a sudden vehicle maneuver and retain functionality afterwards where the force exerted upon the device, equipment, mount, track, fastening devices, or a structure may exceed about 15 Gs (i.e., units of gravitational force or g-force) in a fore-aft direction and exceed about 17 Gs in a lateral direction. In one embodiment, the force exerted upon the device, equipment, mount, track, fastening devices, or a structure may exceed about 22 Gs (i.e., units of gravitational force or g-force) in a fore-aft direction and exceed about 26 Gs in a lateral direction.

SUMMARY OF THE INVENTION

The embodiments described herein address are directed to a versatile and resilient multipurpose container mounting assembly which may provide improved management of stored items and make use of the items and storage system more efficient and expedient, while being adaptable to various types of structures and vehicles, including ambulances. According to one embodiment a container mounting assembly includes one or more mounting plates; each mounting plate has a track engagement surface and a container mounting surface opposite the track engagement surface. The container mounting assembly also includes a plurality of track engagement members outwardly extending from the track engagement surface, the track engagement members capable of engaging one or more track slots of a track member. The container mounting assembly also includes a plurality of mounting receptacles spaced and outwardly extending from the container mounting surface, each mounting receptacle having at least one vertical slot for receiving an insert of a container. The container mounting assembly finally includes a retention locking member proximate at least one of the mounting receptacles and configured to secure the container to the container mounting surface.

In another embodiment, a container assembly includes at least one track member mounted on a vertical support, a container mounting assembly mounted to at least one track member, and a container mounted to the container mounting assembly. The container mounting assembly includes one or more mounting plates; each mounting plate has a track engagement surface and a container mounting surface opposite the track engagement surface. The container mounting assembly also includes a plurality of track engagement members outwardly extending from the track engagement surface, the track engagement members engaging one or more track slots of the track member. The container mounting assembly also includes a plurality of mounting receptacles spaced and outwardly extending from the container mounting surface, each mounting receptacle has at least one vertical slot. The container mounting assembly also includes a retention locking member near at least one of the mounting receptacles. The container includes two exterior shell sections coupled together, and one or more inserts extending outwardly from at least one of the exterior shell sections, the one or more inserts able to engage the vertical slot of the mounting assembly while the retention locking member secures the container to the container mounting surface.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and not intended to limit the subject matter defined by the claims. The following detailed description of the illustrative embodiments can be understood when read in conjunction with the following drawings, where like structure is indicated with like reference numerals and in which:

FIG. 13A depicts a cam track lock according to one or more embodiments shown and described herein;

FIG. 13B depicts a rotational track lock according to one or more embodiments shown and described herein;

FIG. 13C depicts an extension length of the track engaging unit in relation to a track engagement surface of the container mounting assembly according to one or more embodiments shown and described herein;

DETAILED DESCRIPTION

Figure 1:
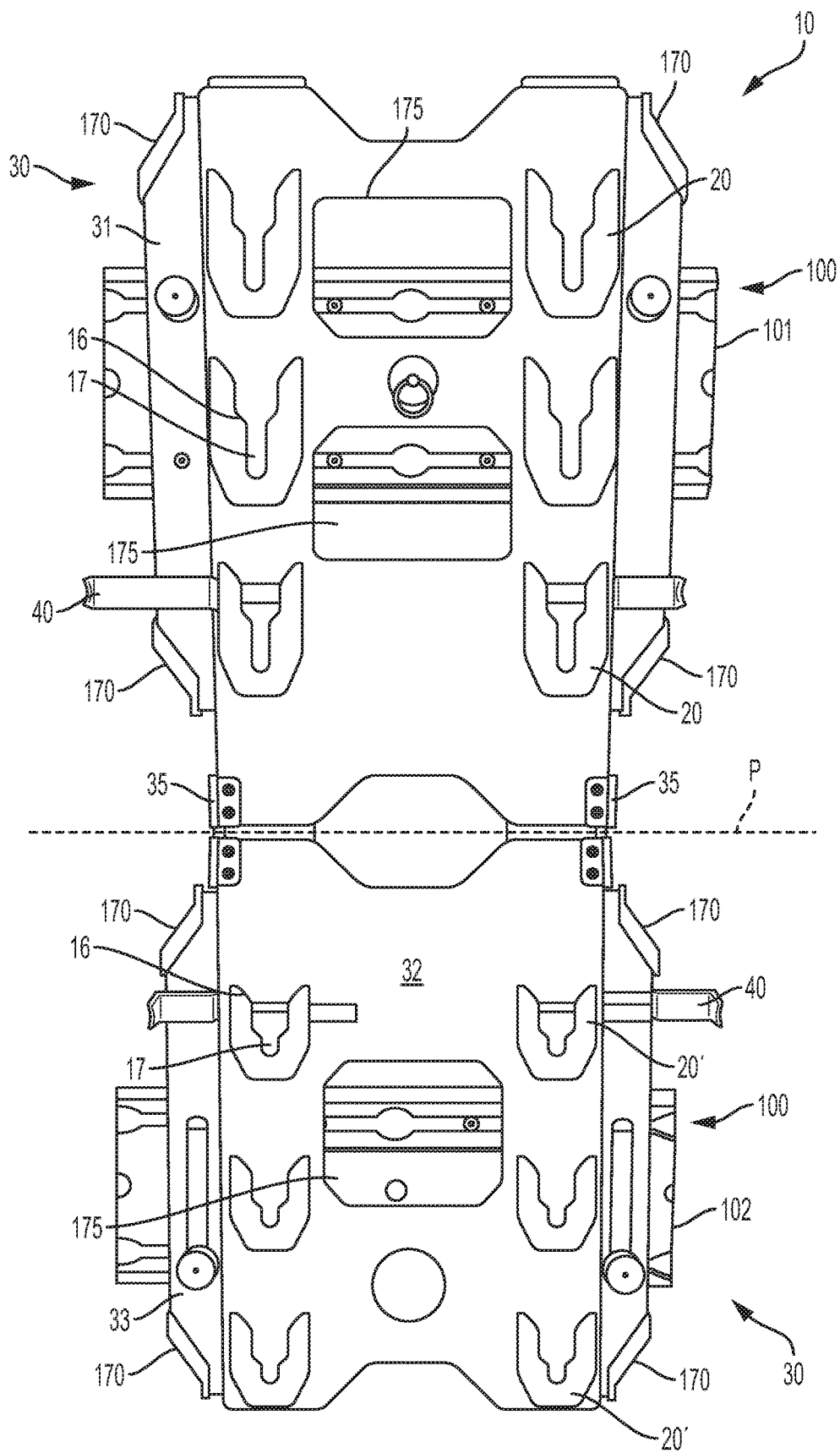
FIG. 1 depicts a front view of a container mounting assembly according to one or more embodiments shown and described herein.

Generally, FIG. 1 illustrates an embodiment of a container mounting assembly which may be used to secure a container to a building structure or the structure of a vehicle such as an ambulance. The container may be a suitcase like device in which supplies, equipment, and the like is stored. The container mounting assembly enables a user to quickly, and without much effort, mount and dismount a container to and from the building structure or structure of a vehicle. The user may lift, align, and lower the container onto one or more mounting receptacles on the container mounting assembly. One or more retention locking members may be engaged in a locked position to capture and prevent the removal of the container from the container mounting assembly. The container and the container mounting assembly may be crash-ready.

Referring now to FIG. 1, an embodiment of a container mounting assembly 10 is shown comprising one or more mounting receptacles 20, one or more retention locking members 40, and one or more mounting plates 30. The container mounting assembly 10 may have any number of mounting plates needed to secure a container 130 (FIG. 19) to a structure. In the embodiment shown in FIG. 1, the container mounting assembly 10 comprises a first mounting plate 31 and a second mounting plate 33. In some embodiments, the first mounting plate 31 is pivotally coupled to the second mounting plate 33 at a coupling location. As used herein, "pivotingly coupled" means that two objects are coupled together to resist linear motion and to facilitate rotation or oscillation between the objects. For example, the first mounting plate 31 and the second mounting plate 33 rotate in relation to each other about a pivot axis p. Other coupling arrangements for the first and second mounting plates are contemplated herein.

Figure 2:
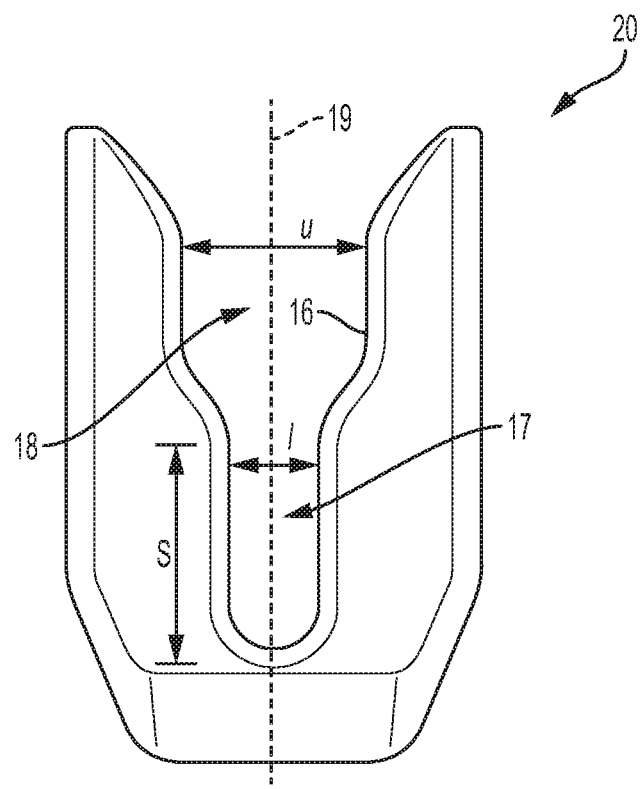
FIG. 2 depicts a front view of a mounting receptacle according to one or more embodiments shown and described herein.
Figure 3:
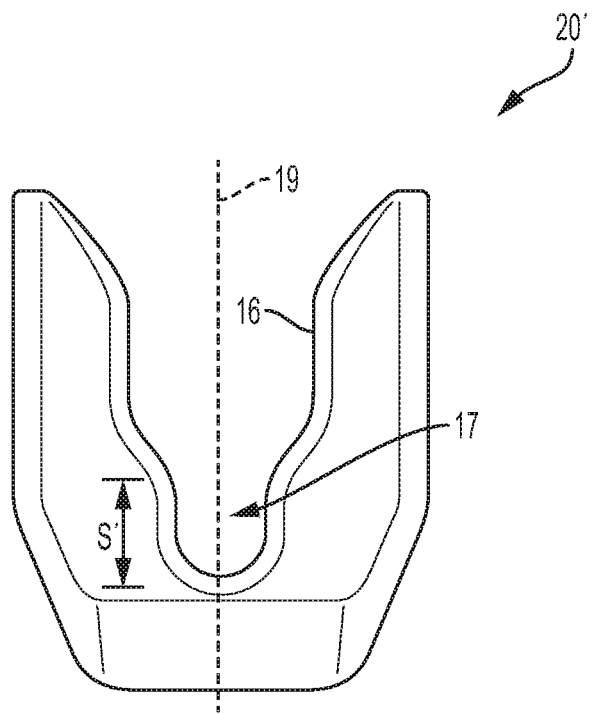
FIG. 3 depicts a front view of another embodiment of the mounting receptacle according to one or more embodiments shown and described herein.

Referring to FIGS. 1, 2 and 3, the one or more mounting receptacles 20 are coupled to the container mounting surface 32 of each mounting plate 30 and comprise at least one vertical slot 17, which may extend from the top of the mounting receptacle 20 to the bottom of the capture area 18. The mounting receptacles 20 may be arranged on the container mounting surface 32 in a plurality of rows, a plurality of columns, or both. Each vertical slot 17 may comprise a downwardly tapering slot 16, which includes at least a portion of the vertical slot 17 that is tapering. The downwardly tapering slot 16 defines a capture area 18, the capture area 18 being capable of retaining a track engagement member, detailed below. Each downwardly tapering slot 16 may have an upper width u and a lower width l extending between the two sides of the vertical slot 17, where the upper width u at an upper section of the downwardly tapering slot 16 is greater than the lower width l at a lower section of the downwardly tapering slot 16. In one or more embodiments, the capture area 18 and vertical slots 17 are about centered on a central axis 19 and the capture area 18 adjoins each vertical slot 17. Each capture area 18 has a capture area length s. FIG. 3 illustrates another embodiment of the one or more mounting receptacles 20'. In this embodiment, each capture area 18 has a capture area length s'. Comparing the two embodiments, they are about the same with the exception of the capture area length where the capture area length s is greater than capture area length s'. In one or more embodiments, it is contemplated that mounting receptacles 20 or 20' may have the same capture area length throughout the mounting plates 30.

Figure 5:
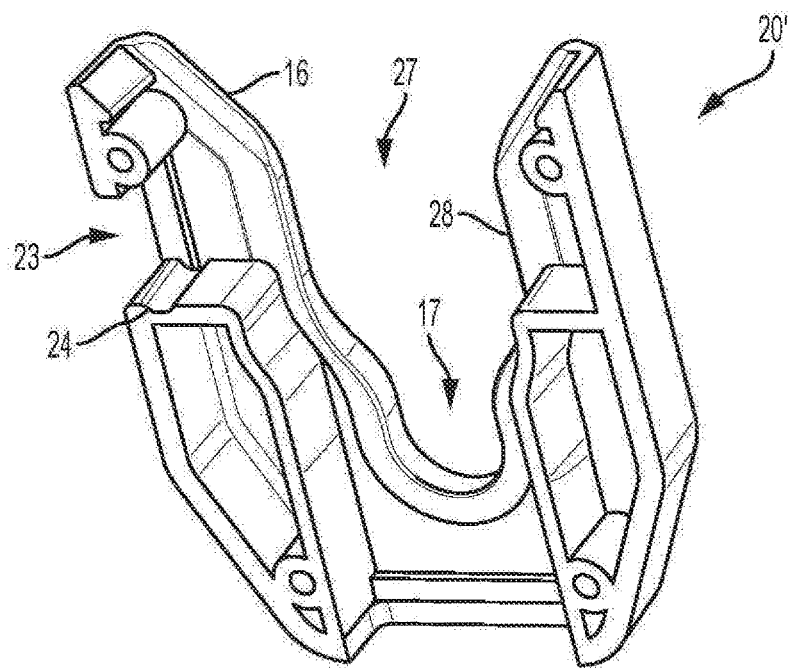
FIG. 5 depicts a back isometric view of a mounting receptacle according to one or more embodiments shown and described herein.

Referring to FIGS. 1 and 5, in certain embodiments the one or more mounting receptacles 20 comprise a mounting receptacle 20 with a retention lock cavity 23. The one or more mounting receptacles 20' comprise a retention lock cavity 23. As shown in FIG. 5, the retention lock cavity 23 may be located at an upper edge of a mounting receptacle 20 or 20'. The retention lock cavity 23 may extend perpendicular to the vertical slot 17. In one or more embodiments, the one or more mounting receptacles 20 or 20' may comprise a lock detent 24. As explained in greater detail hereinafter, the retention lock cavity 23 may slidably couple with a locking block 50 as shown in FIG. 6 and the lock detent 24 may removably couple with a first ball bearing 51 or a second ball bearing 52, which are embedded in locking block 50 but may be freely rolling, as shown in FIG. 7.

Figure 6:
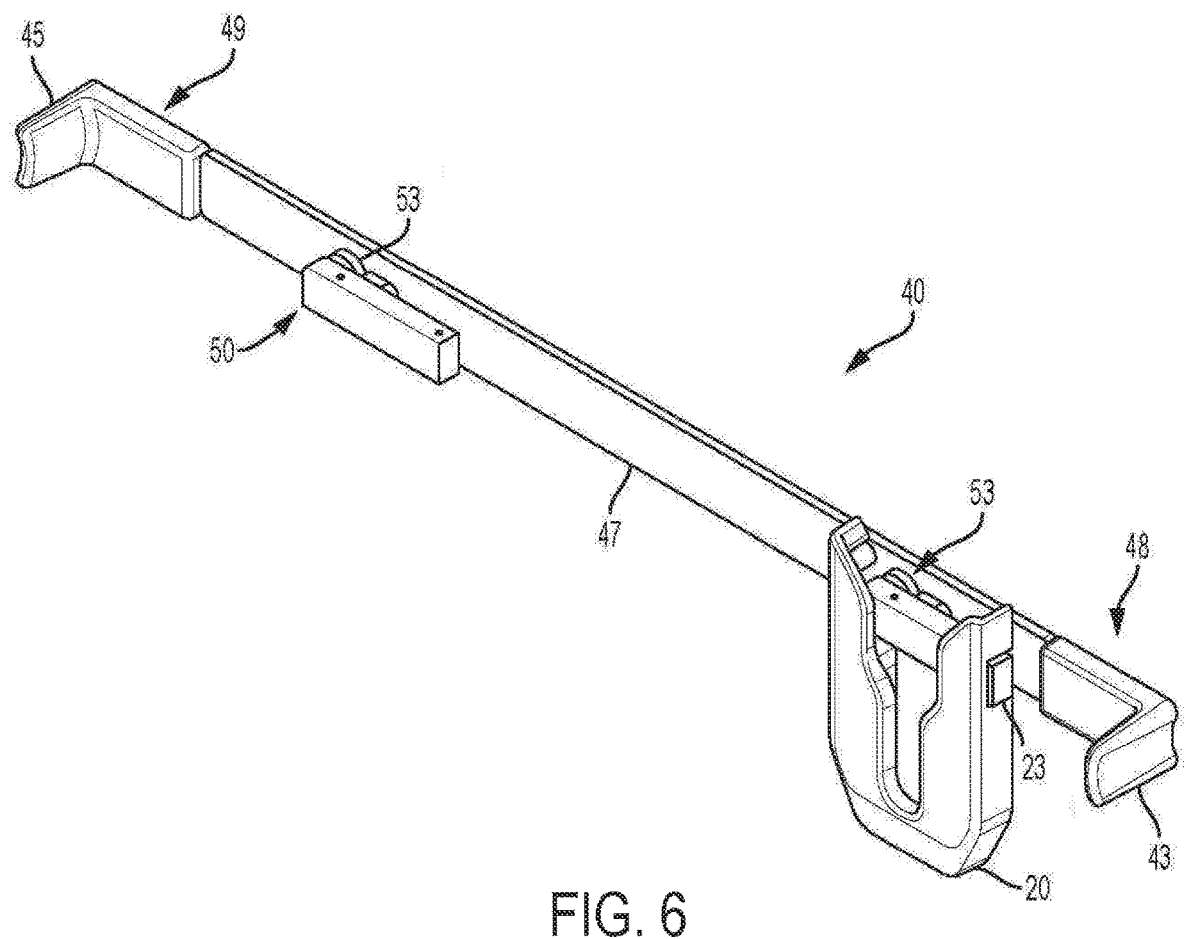
FIG. 6 depicts an isometric view of a retention locking member according to one or more embodiments shown and described herein.

Referring to FIG. 6, in some embodiments the one or more retention locking members 40 are slidably coupled to each mounting plate 30. In one such embodiment, each retention locking member 40 comprises a first handle 43, a second handle 45, a locking bar 47, and one or more locking blocks 50. The locking bar 47 may comprise a first end 48 and a second end 49 wherein the first end 48 is opposite from the second end 49. The first handle 43 is coupled to the first end 48 of the locking bar 47 and the second handle 45 is coupled to the second end 49 of the locking bar 47. The one or more locking blocks 50 are coupled to the locking bar 47 and each locking block 50 may slidably couple with the retention lock cavity 23 of each mounting receptacle 20. When the first handle 43 is moved, causing the locking bar 47 to move, the one or more locking blocks 50 are also moved between coupling and uncoupling the retention lock cavity 23. The first handle 43 and the second handle 45 may comprise contrasting colors. For example, and not limited to, the first handle 43 may be a green color and the second handle 45 may be a red color. The green color corresponds with the locked position and the red color corresponds with the unlocked position. The color contrasting handles may provide a visual indication that the container 130 (FIG. 22) is secured to the container mounting assembly 10 or not. For example, and not limited thereto, in practice the green first handle 43 extending further away from the mounting plate 30 than the red second handle 45 would indicate an unlocked position. In contrast, the red second handle 45 extending further way from the mounting plate 30 than the green first handle 43 would indicate a locked position.

Figure 7:
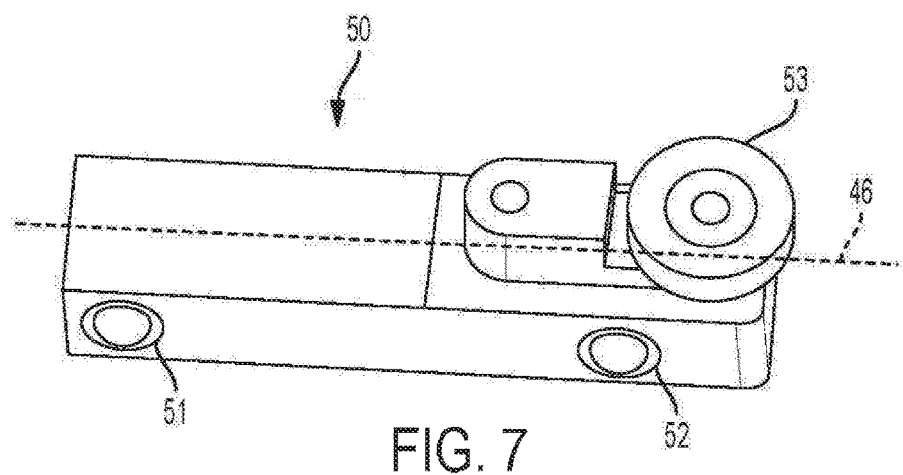
FIG. 7 depicts an isometric view of a locking block according to one or more embodiments shown and described herein.

As shown in FIGS. 6 and 7, an embodiment of the locking block 50 may comprise at least one roller 53. The at least one roller 53 may aid in transitioning of the retention locking member 40 between a locked position and an unlocked position as explained hereinafter. Each roller 53 may engage a lock pocket 28 (shown in FIG. 5) to maintain alignment of a locking block axis 46 orthogonal to the central axis 19 of the mounting receptacles 20 or 20'. The locking block 50 may also comprise a first ball bearing 51 and a second ball bearing 52. When the retention locking member 40 is in the unlocked position (the retention locking member 40 of first mounting plate 31 as shown in FIG. 1), the first ball bearing 51 is biased into the lock detent 24 (FIG. 5) and restricts the movement of the retention locking member 40 in the unlocked position and when the retention locking member 40 is in the locked position (the retention locking member 40 of second mounting plate 33 as shown in FIG. 1, also FIG. 6), the second ball bearing 52 is biased into the lock detent 24 and restricts the movement of the retention locking member 40 in the locked position. The first ball bearing 51 and the second ball bearing 52 may be biased by, for example, a spring, compressive fluid, foam, rubber, and the like.

FIG. 1 illustrates one embodiment of the locked (first mounting plate 31) and unlocked positions (second mounting plate 33) of the one or more retention locking members 40. The retention locking member 40 coupled to the first mounting plate 31 illustrates the locked position and the retention locking member 40 coupled to the second mounting plate 33 illustrates the unlocked position. It is contemplated that the opposite could be a possible embodiment. Referring to FIGS. 5 and 6, each mounting receptacle 20 and 20' may comprise a retention opening 27 which spans horizontally across at least a portion of the mounting receptacle 20 and 20' and capture area 18. The locking block 50 may cover the retention opening 27 of the mounting receptacle 20 and 20' when the retention locking member 40 is in the locked position and the locking block 50 may not cover the retention opening 27 of the mounting receptacle 20 and 20' when the retention locking member 40 is in the unlocked position.

Figure 8:
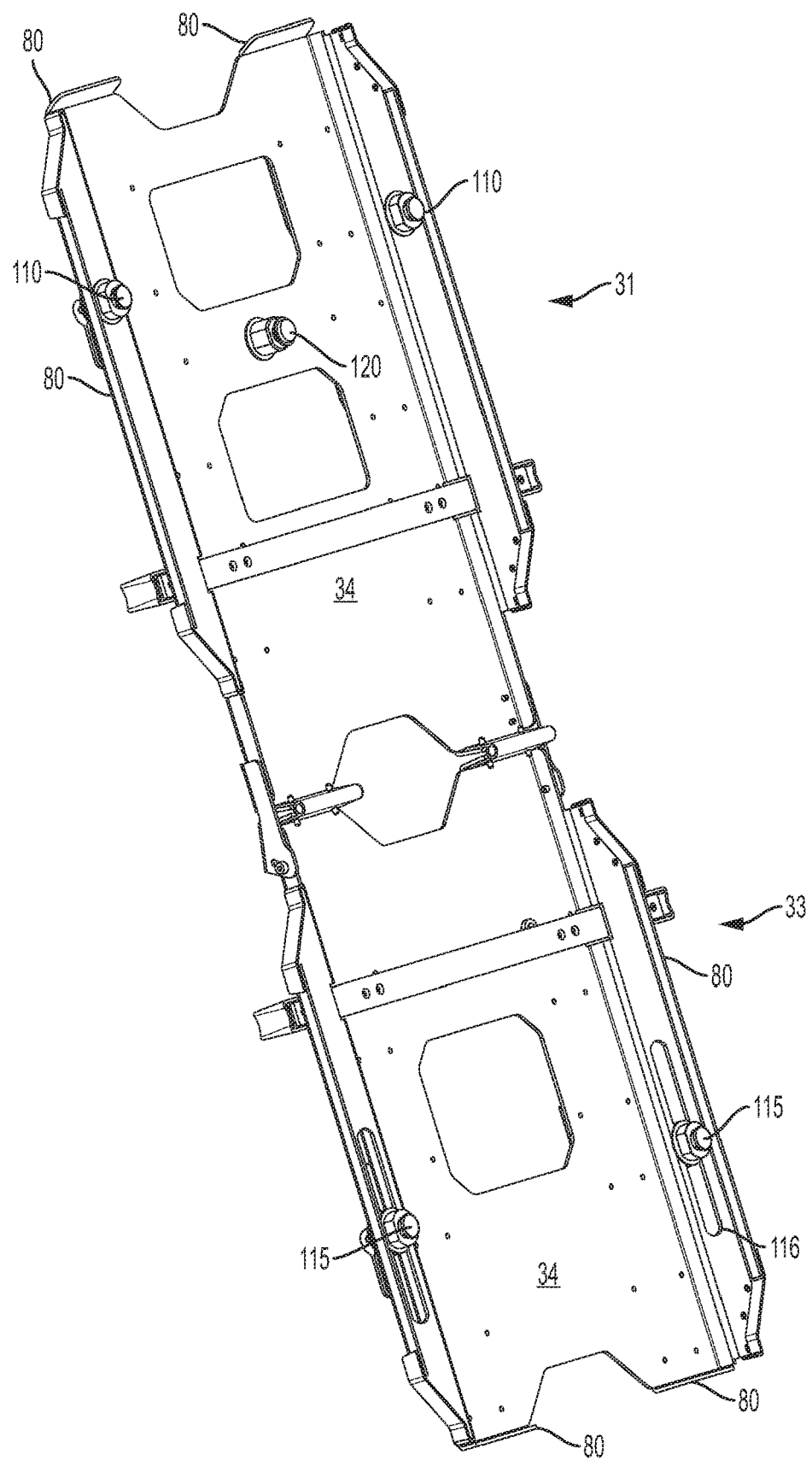
FIG. 8 depicts a rear view of the container mounting assembly according to one or more embodiments shown and described herein.
Figure 9:
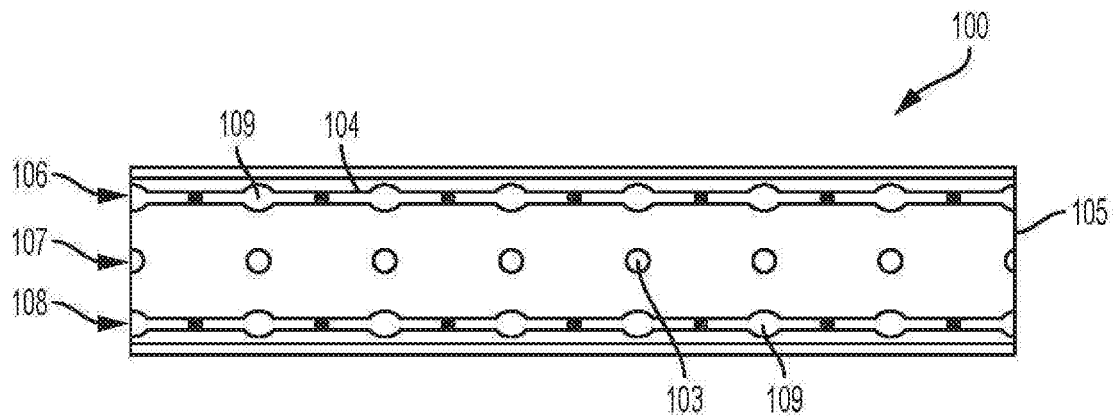
FIG. 9 depicts a front view of a track member according to one or more embodiments shown and described herein.
Figure 10:
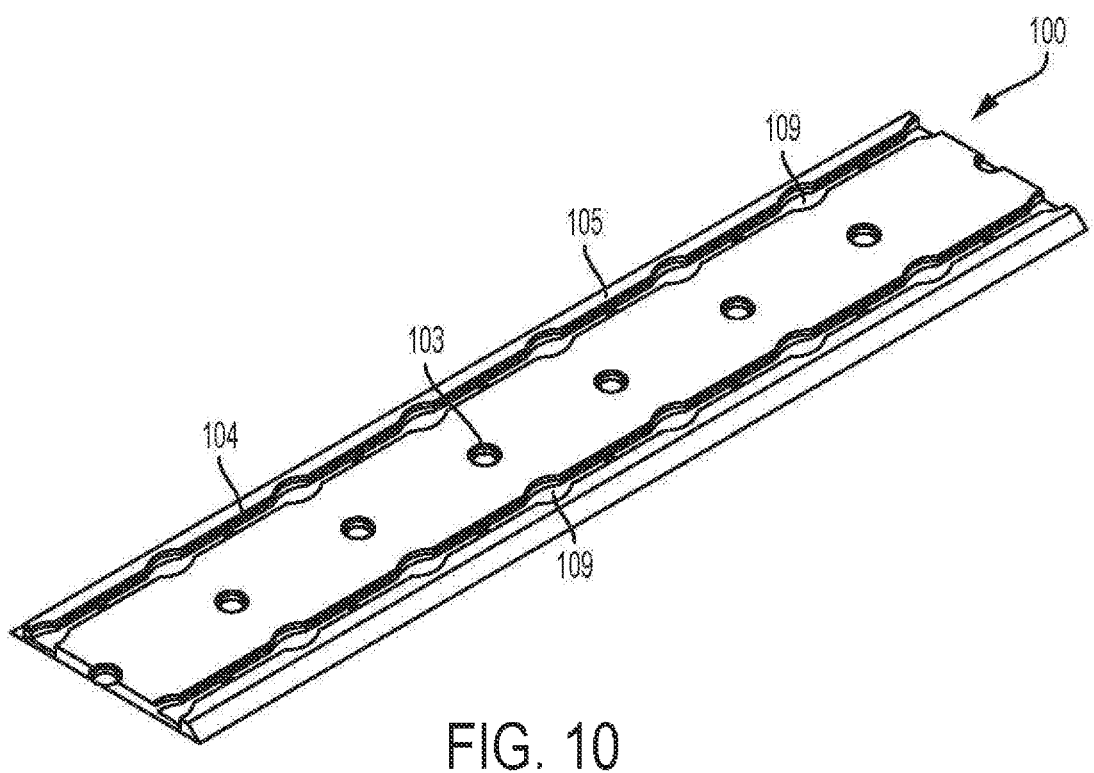
FIG. 10 depicts an isometric view of the track member according to one or more embodiments shown and described herein.
Figure 11:
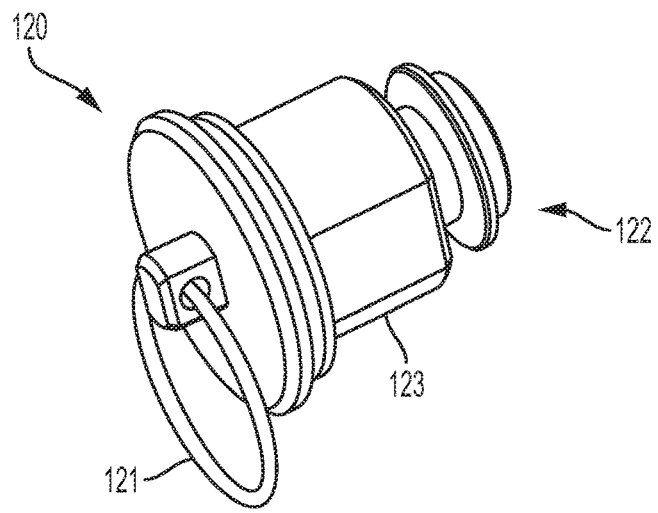
FIG. 11 depicts an isometric view of a locking pin according to one or more embodiments shown and described herein.

Referring now to FIG. 8, an embodiment of the rear of the container mounting assembly 10 is shown. The container mounting assembly 10 may comprise a locking pin 120, one or more upper track locks 110, and one or more lower track locks 115. The upper or lower track locks may be fixed track locks, sliding track locks, or both. All track locks and locking pins are track engagement members, configured to be coupled with the track member 100 (FIGS. 9 and 10). Fixed track locks are fixedly coupled to the track engagement surface 34 and extending outwardly the track engagement surface 34, being non-movable. Sliding track locks are slidingly coupled to the track engagement surface 34 and extending outwardly the track engagement surface 34, being adjustable by sliding along a track lock guide 116. Referring to FIG. 11, the locking pin 120 may be retracted by pulling, against the biasing force, on the pull ring 121 such that the locking pin plunger 122 is retracted from the locking pin aperture 103. The locking pin 120 is coupled to a mounting plate 30 and extends outwardly from a track engagement surface 34 of the mounting plate 30 in an extended position. The one or more upper track locks 110 may be fixedly coupled to the first mounting plate 31 and extend outwardly from the track engagement surface 34 of the first mounting plate 31. The one or more lower track locks 115 may be slidably coupled to the second mounting plate 33 and extend outwardly from the track engagement surface 34 of the second mounting plate 33.

FIGS. 9 and 10 depicts a front view and isometric view of a contemplated embodiment of one or more track members 100 respectively as shown and described in PCT/US2014/050392 which is herein incorporated by reference in its entirety. Each track member 100 may include one or more track slots. These track slots may be a first outer track slot 106 and second outer track slot 108 on a face of the backing plate 105. Each track member 100 may also include a backing plate 105, and a center row 107 on a face of the backing plate 105. The two track slots and the center row 107 are substantially parallel to each other. The first outer track slot 106 and the second outer track slot 108 may comprise a plurality of target regions 109 that are adjacent to necked-down regions 104. The target regions 109 may be diamond contoured or any other design or contour that will allow for coupling with track engagement members. The necked-down regions 104 prevent the track engagement members from disengaging from the track member 100 by having an open section that is smaller than the widest portion of the track engagement members coupled to the track member 100. The track engagement members are decoupled from the track member 100 when the track engagement members are slid to the target regions 109 and away from the necked-down regions 104. The plurality of target regions 109 allow an enlarged head portion 139 (FIG. 19) of an insert 135 (FIG. 19) to engage the track slots, such as the first outer track slot 106 and the second outer track slot 108. In some embodiments, the enlarged head portion 139 of the insert 135 may comprise a flanged end, the flanged end having a diameter smaller than the width of the upper section of the downwardly tapering slot 16 and greater than the width of the lower section of the downwardly tapering slot 16. In some embodiments, the plurality of target regions 109 are symmetrical such that they are spaced equidistant apart and are aligned in widthwise rows along the length of the backing plate 105. The center row 107 has a plurality of locking pin apertures 103 in the backing plate 105. In one embodiment, the locking pin apertures 103 are in horizontal alignment with the first outer track slot 106 and the second outer track slot 108.

The plurality of target regions 109 allow the container mounting assembly 10 (FIG. 1) to be mounted to each track member 100 with a degree of misalignment that may come from the inability to see and align the container mounting assembly 10 to the plurality of target regions 109 of the track member 100. The container mounting assembly 10 may be rotated slightly in relation to the each track member 100 and the track engaging units 85 (FIG. 13A) will still engage the plurality of target regions 109. As the track engaging units 85 are inserted into plurality of target regions 109, the container mounting assembly 10 will come into alignment with each track member 100. In other words, the plurality of target regions 109 allow for some rotation in the container mounting assembly 10 and still enable a successful engagement of the one or more track engaging units 85 with the track slots.

FIG. 11 depicts an isometric view of an embodiment of the locking pin 120. The locking pin 120 may be biased (e.g., by a spring, resilient material, or other biasing means) outward towards an extended lock position for engaging the track member 100 of FIG. 9, and more specifically the corresponding locking pin aperture 103 of the center row 107 (FIG. 9) of the one or more track members 100. Alternatively to the locking pin 120 engaging the locking pin aperture 103, the locking pin 120 may be positioned on the container mounting assembly 10 (FIG. 8) to engage the first outer track slot 106, the second outer track slot 108, or both. The pull ring 121 is coupled to the locking pin plunger 122. A locking pin body 123 is coupled to the first mounting plate 31 such that when the container mounting assembly 10 is coupled to the one or more track members 100, the locking pin plunger 122 is aligned with the center row 107. In another embodiment, as indicated hereinbefore, the locking pin 120 may be coupled to the first mounting plate 31 such that it is aligned with either the first outer track slot 106, the second outer track slot 108, or both. For the locking pin 120 to engage both the first outer track slot 106 and the second outer track slot 108, more than one locking pin 120 is coupled to a mounting plate 30.

Referring to FIGS. 8 and 11, depicted is an embodiment of the one or more upper track locks 110 and the one or more lower track locks 115 may comprise either a cam track lock 60 (FIG. 13A), a rotational track lock 70 (FIG. 13A), or any other suitable track lock. The operation of a cam track lock 60 and a rotational track lock 70 are detailed below. Any embodiment may use a track engaging unit 85 (FIG. 13A) which may take on at least the two forms shown in FIGS. 12A and 12B. The track engaging unit 85 slidably couples with the track slots of the one or more track members 100. Referring to the two embodiments shown in FIGS. 12A and 12B, the track engaging unit 85 may comprise an engagement head 89 which is coupled to the engagement body 88. The engagement body 88 may comprise a bias ring 87 and a release dow 86. The bias ring 87 provides a surface area for the biasing force to be exerted upon to bias the mounting insert in the extended position. The engagement head 89 may slide into the track member 100.

Figure 12A:
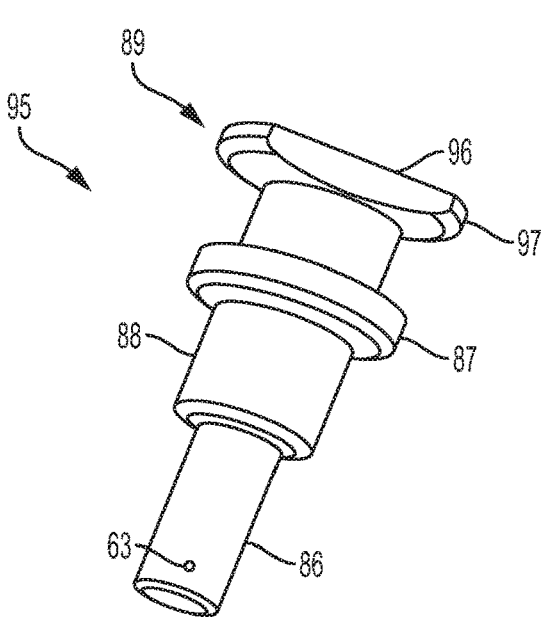
FIG. 12A depicts a round-head engaging unit according to one or more embodiments shown and described herein.
Figure 12B:
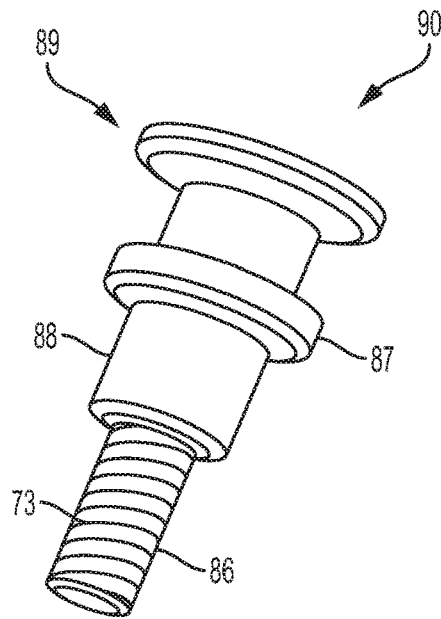
FIG. 12B depicts a t-head engaging unit according to one or more embodiments shown and described herein.
Figure 12C:
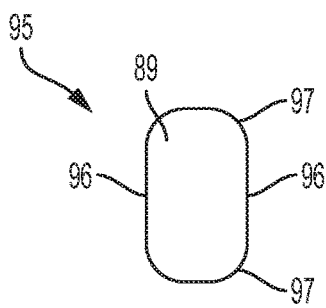
FIG. 12C depicts a front view of the t-head engaging unit according to one or more embodiments shown and described herein.
Figure 12D:
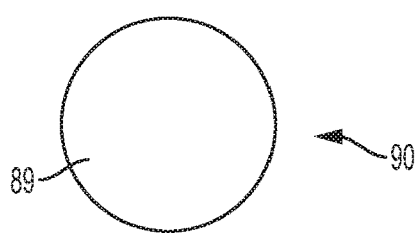
FIG. 12D depicts a front view of the round-head engaging unit according to one or more embodiments shown and described herein.

Many track lock geometries are contemplated. In one embodiment as shown in FIG. 12A, a t-head engaging unit 95. The t-head engaging unit 95 is a track engaging unit 85 wherein the engagement head 89 has two flat sides 96, opposite each other, and two rounded sides 97, opposite each other. FIG. 12C depicts a front view of the t-head engaging unit 95. FIG. 12B depicts a round-head engaging unit 90. The round-head engaging unit 90 is a track engaging unit wherein the engagement head 89 is circular in shape as shown in FIG. 12D. Both the t-head engaging unit 95 and the round-head engaging unit 90 may be track engagement members.

In one embodiment, the t-head engaging unit 95 may be used in the lower track lock 115 to enable the second mounting plate 33 to be secured to a lower track member 102 (FIG. 1) after the first mounting plate 31 has been secured to the upper track member 101 (FIG. 1). Once the first mounting plate 31 is secured to the one or more track members 100, the one or more lower track locks 115 are slid in the track lock guide 116 (FIG. 8) until the t-head engaging unit 95 aligns with the track slots, such as the first outer track slot 106 or the second outer track slot 108. The lower track lock 115 will rotate the t-head engaging unit 95 such that the flat side 96 is substantially parallel to the track slots. This will allow the t-head engaging unit 95 to be inserted into either track slot in a necked-down region 104 without the need to engage the plurality of target regions 109 of the track slots. When the t-head engaging unit 95 is inserted into the track slot, the lower track lock 115 will rotate the t-head engaging unit 95 about 90 degrees such that the rounded side 97 now engages the necked-down regions 104 of the slots. The lower track lock 115 will then exert a clamping force to secure the second mounting plate 33 to the lower track member 102 as discussed herein. In another embodiment, the t-head engaging unit 95 may be used in the one or more upper track locks 110. This may allow the second mounting plate 33 to be secured to the one or more track members 100 before the first mounting plate 31.

FIG. 13A depicts an embodiment of a cam track lock 60. The cam track lock 60 may comprise a lever 61, a cam 62, and a track engaging unit 85. The lever 61 is coupled to the cam 62 and the track engaging unit 85. Referring to FIG. 12A, the release dow 86 comprises a cam aperture 63. Referring back to FIG. 13A, a cam pin 64 couples with the cam aperture 63 on the track engaging unit 85 to secure the lever 61 to the track engaging unit 85. It should be noted that the cam aperture 63 may be on either a t-head engaging unit 95 (FIG. 12A), round-head engaging unit 90 (FIG. 12B), or any other suitable track engagement unit. When the lever 61 is in an extended position (i.e., parallel with the track engaging unit 85), the track engaging unit 85 is extended away from the track engagement surface 34 (FIG. 8) of the first mounting plate 31 and when the lever 61 is in a retracted position (shown in FIG. 13A), the track engaging unit 85 is retracted towards the track engagement surface 34 of the first mounting plate 31. The retracted position of the track engaging unit 85 provides a clamping force which draws the container mounting assembly 10 towards the one or more track members 100. The extended position releases the clamping force and allows the container mounting assembly 10 to move in relation to the one or more track members 100. As discussed hereinafter, one or more tabs 80 (FIG. 17) may make contact with the one or more track members 100 to reduce or prevent movement between the container mounting assembly 10 and the one or more track members 100. The clamping force provided by the upper track lock 110 and the lower track lock 115 (e.g., the cam track lock 60 and the rotational track lock 70 (FIG. 13B)) provides that contact between the one or more tabs 80 and the one or more track members 100.

FIG. 13B depicts an embodiment of a rotational track lock 70. The rotational track lock 70 comprises a knob 71 and a lock body 72. The knob 71 is coupled to the track engaging unit 85. Referring to FIG. 12B, the release dow 86 may comprise threads 73. It should be noted that the threads 73 may be on either the t-head engaging unit 95 (FIG. 12A) or the round-head engaging unit 90 (FIG. 12B). The knob 71 may be rotationally coupled to the track engaging unit 85 such that when the knob 71 is rotated, an extension length L (FIG. 13C) is either increased or decreased depending on the number of revolutions of the knob 71 in relation to the lock body 72. FIG. 13 C illustrates the extension length L of the track engaging unit 85 in relation to a track engagement surface 34 of the container mounting assembly 10.

Referring to FIGS. 8, 12A, 12B, and 13B, in one embodiment, each upper track lock 110 may comprises the knob 71 and a round-head engaging unit 90. The knob 71 may be coupled to the round-head engaging unit 90 such that an extension length L of the round-head engaging unit 90 extends from the track engagement surface 34 of the first mounting plate 31. The extension length L may be dictated by the number of revolutions of the knob 71 and each lower track lock 115 comprises a knob 71 and a t-head engaging unit 95. The knob 71 is coupled to the t-head engaging unit 95 such that a lower extension length L of the t-head engaging unit 95 extends from the track engagement surface 34 of the second mounting plate 33 and may be dictated by the number of revolutions of the knob 71.

Referring to FIGS. 8, 12A, 12B, and 13A, in one embodiment, each upper track lock 110 comprises a lever 61, a cam 62, and a round-head engaging unit 90 wherein the lever 61 is coupled to the cam 62 and the round-head engaging unit 90. When the lever 61 is in an extended position, the round-head engaging unit 90 is extended from a track engagement surface 34 of the first mounting plate 31 and when the lever 61 is in a retracted position, the round-head engaging unit 90 is retracted towards the track engagement surface 34 of the first mounting plate 31. Each lower track lock 115 may comprise the lever 61, the cam 62, and the t-head engaging unit 95 wherein the lever 61 is coupled to the cam 62 and the t-head engaging unit 95. When the lever 61 is in an extended position, the t-head engaging unit 95 is extended from a track engagement surface 34 of the second mounting plate 33 and when the lever 61 is in a retracted position, the t-head engaging unit 95 is rotated and retracted towards the track engagement surface 34 of the second mounting plate 33.

Figure 19:
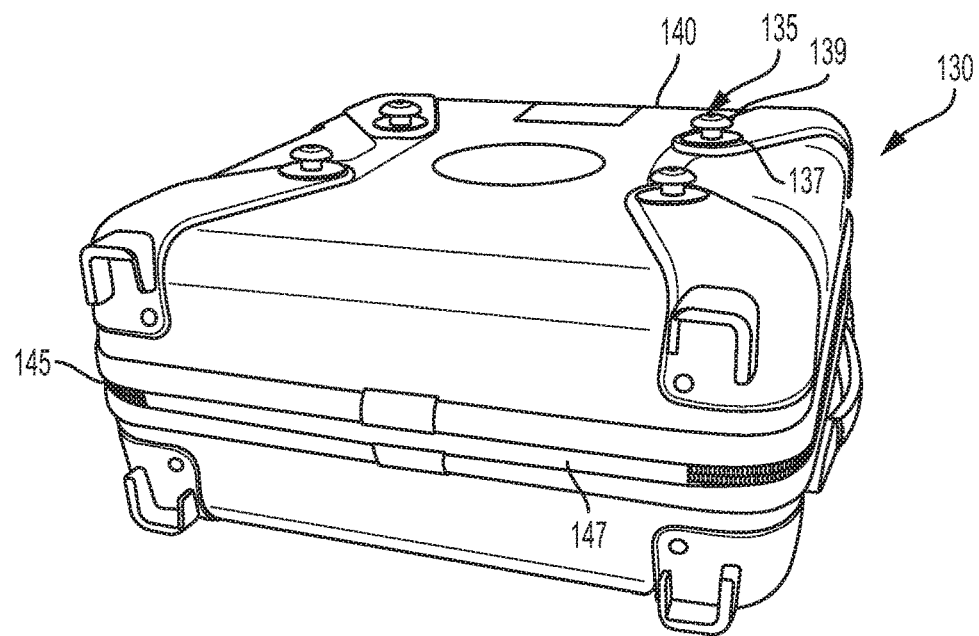
FIG. 19 illustrates a bottom perspective view of a container according to one or more embodiments shown and described herein.

FIG. 1 illustrates one embodiment where the container mounting assembly 10 is secured to an upper track member 101 and a lower track member 102. The relation of the upper track locks 110 and the locking pin 120 may be varied depending on the use of the container mounting assembly 10. For example, FIG. 1 illustrates the one or more upper track locks 110 elevated above the locking pin 120, however, it is contemplated that the one or more upper track locks 110 may engage the other track slot in the upper track member 101 such that the one or more upper track locks 110 are elevated below the locking pin 120. The spacing of the one or more track members 100 on the wall or other surface (e.g., structure, building, or vehicle) may be defined by the container mounting assembly 10 which is defined by the container 130 (FIG. 19). For example, and not limited to, a new container may dictate the need for a new container mounting assembly and new spacing and/or more or less tracks to secure the container mounting assembly to the structure.

Figure 14:
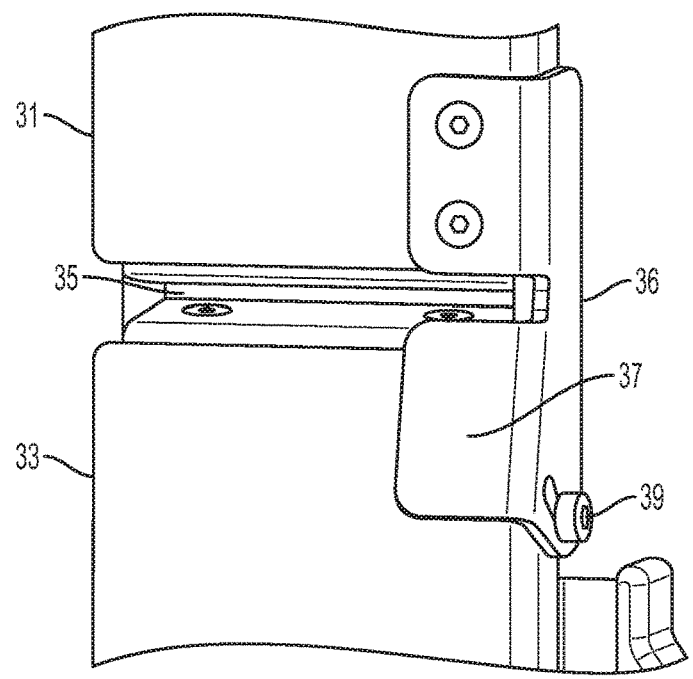
FIG. 14 is a perspective view of a hinge and a plate securing member according to one or more embodiments shown and described herein.
Figure 15:
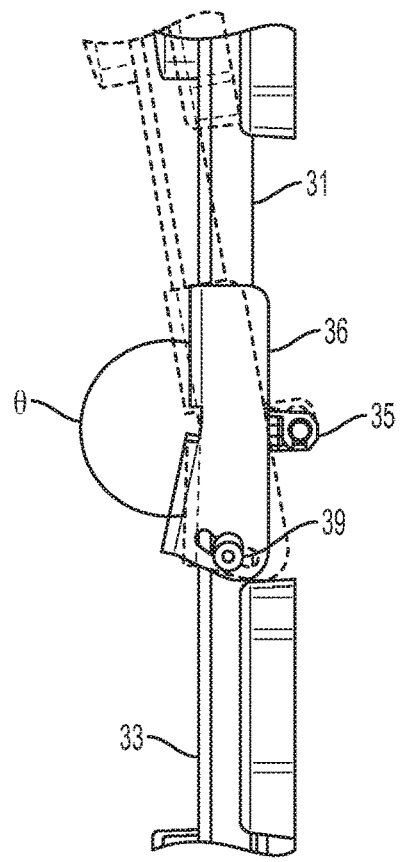
FIG. 15 is a side view of the hinge and the plate securing member according to one or more embodiments shown and described herein.
Figure 16:
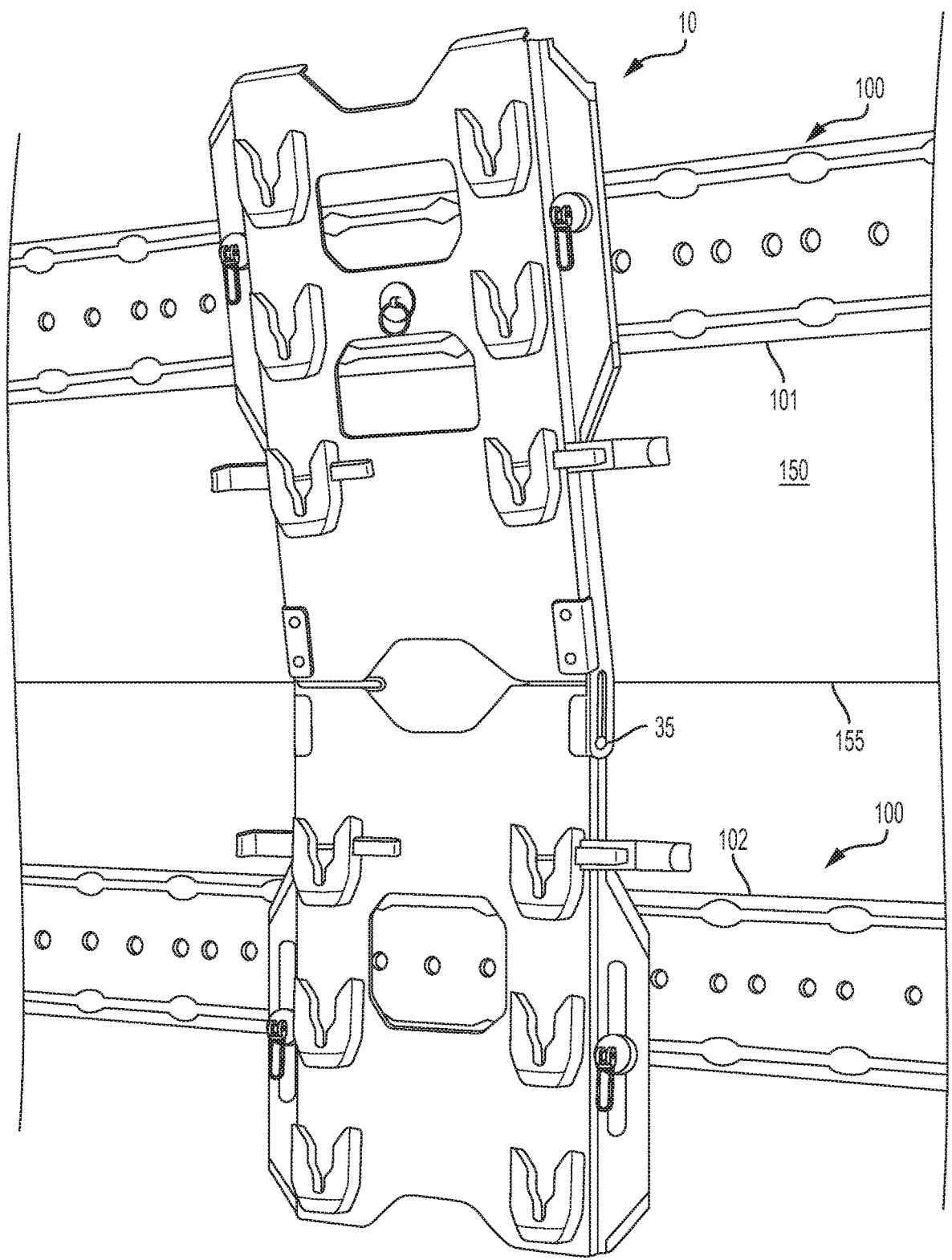
FIG. 16 illustrates the container mounting assembly coupled to one or more track members according to one or more embodiments shown and described herein.

In one embodiment, one or more hinges 35 may pivotally couple two or more mounting plates 30 together. In the embodiment shown in FIG. 1, the first mounting plate 31 is coupled to the second mounting plate 33 with one or more hinges 35. Referring to FIGS. 14 and 15, the one or more hinges 35 may allow the first mounting plate 31 to pivotally couple with the second mounting plate 33. One or more plate securing members 36 may be coupled to the first mounting plate 31 and comprise a bump stop 37 and a set screw 39. The bump stop 37 may limit the range of rotation angle θ of the first mounting plate 31 in relation to the second mounting plate 33. The set screw 39 may restrain the movement of the first mounting plate 31 in relation to the second mounting plate 33 when it is tightened. FIG. 16 illustrates the container mounting assembly 10 coupled to one or more track members 100 where the structure 150 has a crease 155. The crease 155 means that the upper track member 101 and the lower track member 102 do not lie along a common plane. Therefore, the rotation angle θ of the one or more hinges 35 is not 180 degrees but at some angle less than 180 degrees. The set screw 39 restrains movement of the one or more hinges 35 and maintains the rotation angle θ once set. For example, and not by way of limitation, the set screw 39 may restrain movement between the first mounting plate 31 and the second mounting plate 33 such that the mounting plates 30 do not rattle or move as a container 130 (FIG. 21) is removably coupled to the container mounting assembly 10.

Figure 17:
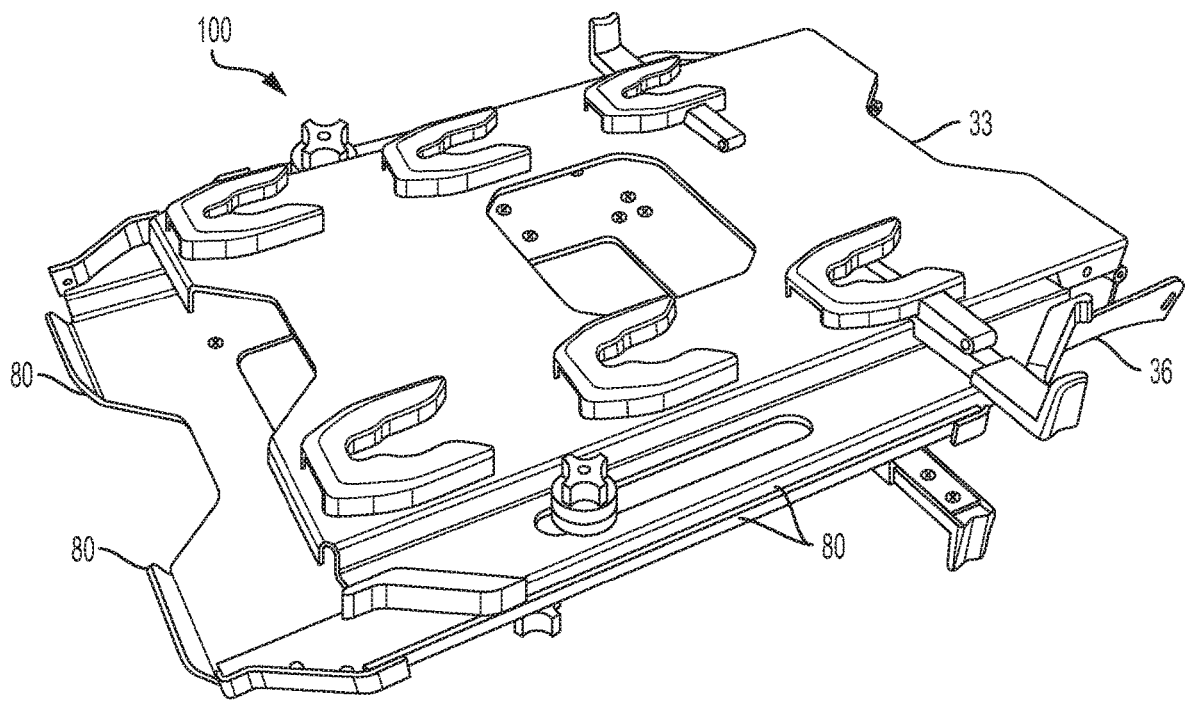
FIG. 17 an right side isometric view of a folded container mounting assembly according to one or more embodiments shown and described herein.
Figure 18:
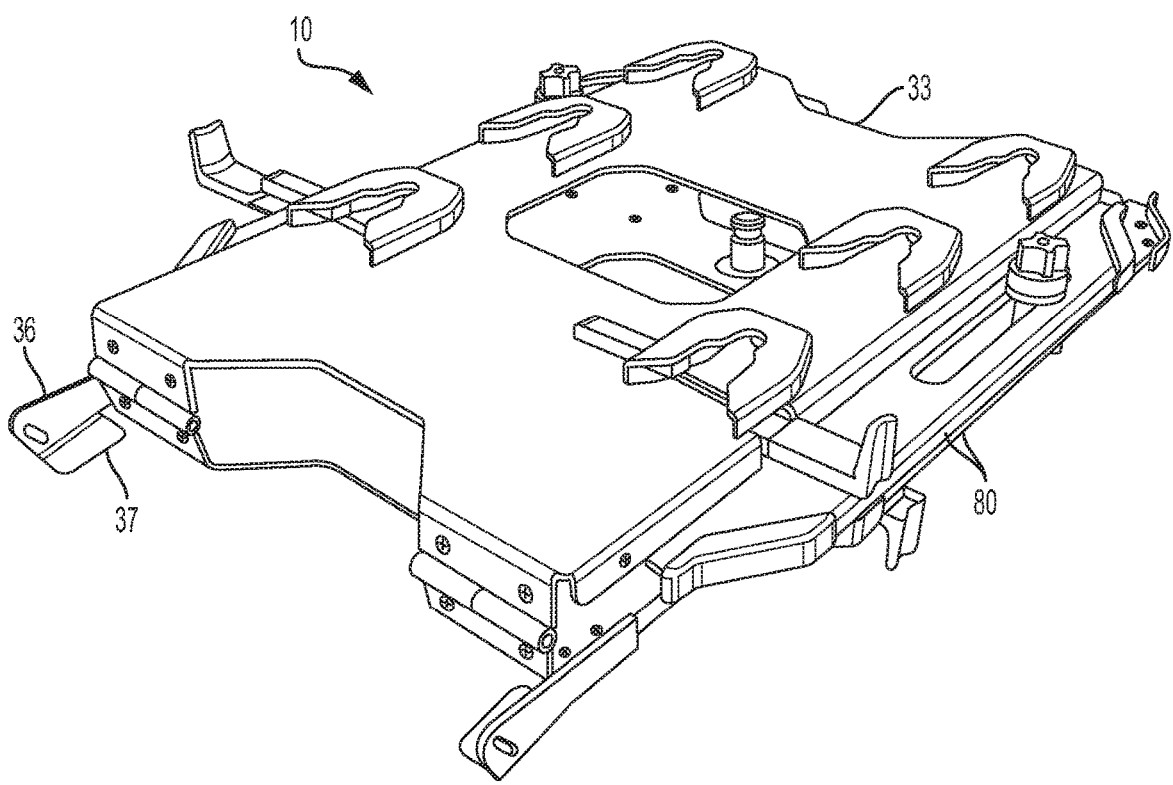
FIG. 18 a left side isometric view of the folded container mounting assembly according to one or more embodiments shown and described herein.

FIGS. 17 and 18 depict the container mounting assembly 10 in a folded position such that the first mounting plate 31 and the second mounting plate 33 are substantially parallel to each other. The container mounting assembly 10 in the folded position may allow a user to transport the container mounting assembly 10 to another location or allow a user to store the container mounting assembly 10 in a smaller space than when the container mounting assembly 10 is not folded. In one embodiment, a clasp or latch (not shown) may be used to restrain the position of the first mounting plate 31 relative to the second mounting plate 33 in the folded position as shown.

Figure 20:
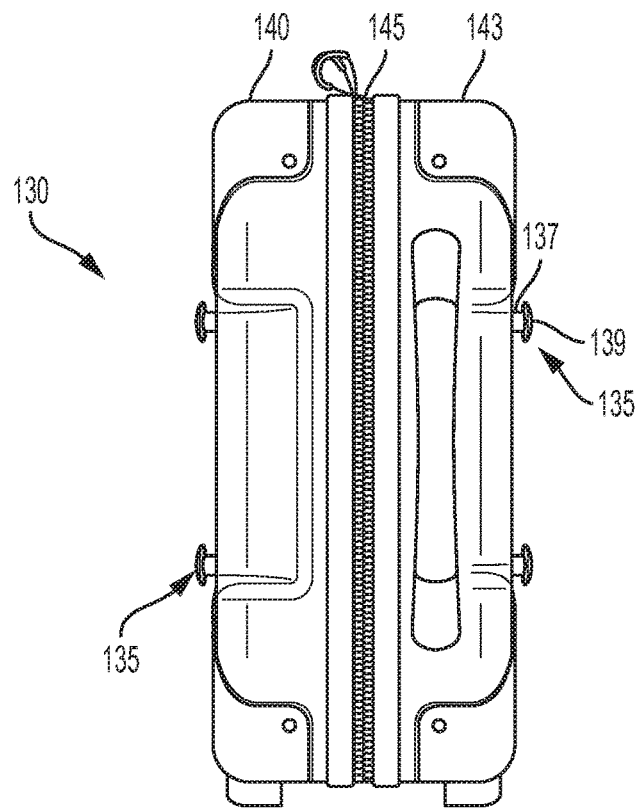
FIG. 20 illustrates a left side view of the container according to one or more embodiments shown and described herein.

FIGS. 19 and 20 depict a bottom perspective view and a side view of one embodiment of a container 130 respectively. One embodiment of the container 130 is a crash-ready, portable, modular, compartmentalization softwall device and system for organizing and securing items for transport as shown and described in application PCT/US2014/050288 which is herein incorporated by reference in its entirety. The container 130 may include a first half shell 140 and a second half shell 143 forming an exterior surface of the container 130. A plurality of inserts 135 may be coupled to the container 130 and comprise a stem portion 137 and an enlarged head portion 139 as shown and described in PCT/US2014/050392 which is herein incorporated by reference in its entirety. The insert 135 is an interface between the container 130 and the track member 100 (FIG. 9). The container 130 may have any number of inserts 135 affixed to it to support the weight of the container 130. Increasing in the number of inserts 135 affixed to the container 130 may increase the load bearing capacity of the container 130.

Figure 4:
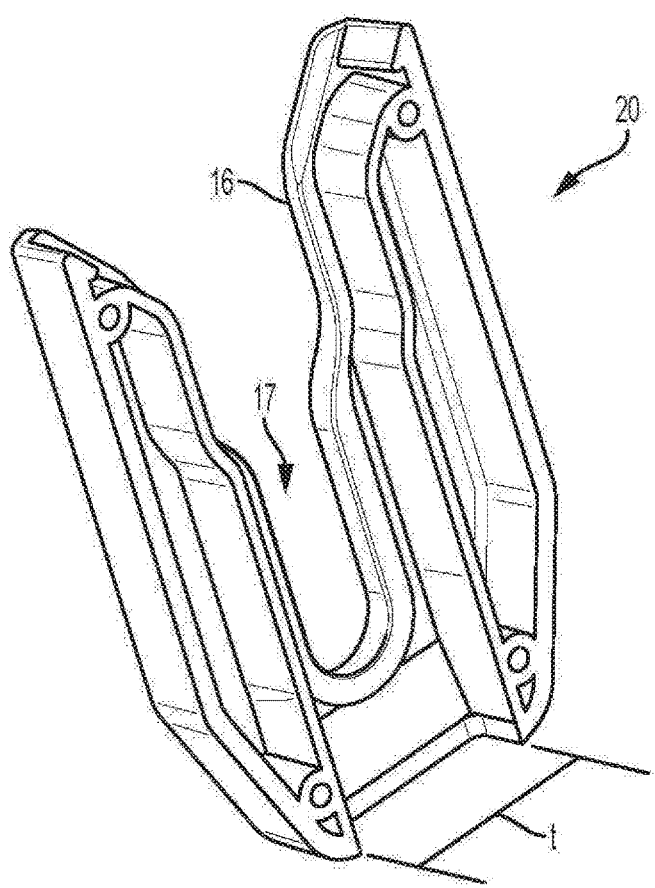
FIG. 4 depicts a back isometric view of the mounting receptacle according to one or more embodiments shown and described herein.

The stem portion 137 and the enlarged head portion 139 may be sized accordingly to bear the load of the container 130 and its contents. Referring to FIG. 4, a head slot t, an area within the mounting receptacles 20 and 20' designed to accept the enlarged head portion 139 of the inserts 135, may be sized to accommodate the enlarged head portion 139. As discussed hereinbefore, the downwardly tapering slot 16, the capture area 18, and each vertical slot 17 may either be the same across all of the embodiments of the mounting receptacles 20 and 20' and mounting receptacles 20 and 20' or they may differ depending on the size of the inserts 135 used in each application. For example, and not limited to, the stem portion 137 and the enlarged head portion 139 of the inserts 135 on the first half shell 140 may be larger in relation to the stem portion 137 and enlarged head portion 139 of the inserts 135 on the second half shell 143. In one embodiment, the inserts 135 coupled to the first half shell 140 and the second half shell 143 may be dimensionally the same. In another embodiment, the first half shell 140 may be required to support the full load of the container 130 before the second half shell 143 is coupled to the container mounting assembly 10. Therefore, the inserts 135 of the first half shell 140 may be more robust (i.e., dimensionally larger) than the inserts 135 of the second half shell 143. The downwardly tapering slot 16, the capture area 18, each vertical slot 17, and the head slot t of the one or more mounting receptacles 20 and one or more mounting receptacles 20 coupled to the first mounting plate 31 may also be sized accommodate the larger inserts 135 coupled to the first half shell 140 and support the increased load bearing weight of the container 130.

Figure 21:
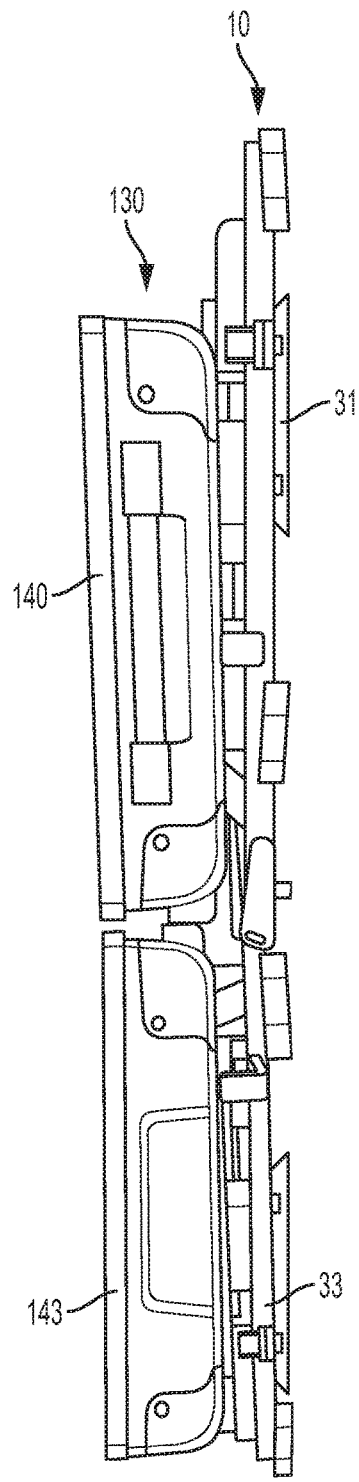
FIG. 21 depicts a side view of the container coupled to the container mounting assembly according to one or more embodiments shown and described herein.

Still referring to FIGS. 19 and 20, the container 130 is shown in the closed position. The first half shell 140 and the second half shell 143 may be coupled together in the closed position with a fastener 145 such as a zipper, hook and loop fasteners, buttons, loop and posts, and the like. In the open position, as illustrated in FIG. 21, the first half shell 140 is pivotally coupled 147 to the second half shell 143 along a common side. For example, and not by way of limitation, the pivot couple 147 may be a butt hinge, a strap hinge, a t-hinge, a double-acting hinge, and the like. Additional embodiments of the container 130 are contemplated such as those shown and described in PCT/US2014/050288 which is herein incorporated by reference in its entirety.

Figure 23:
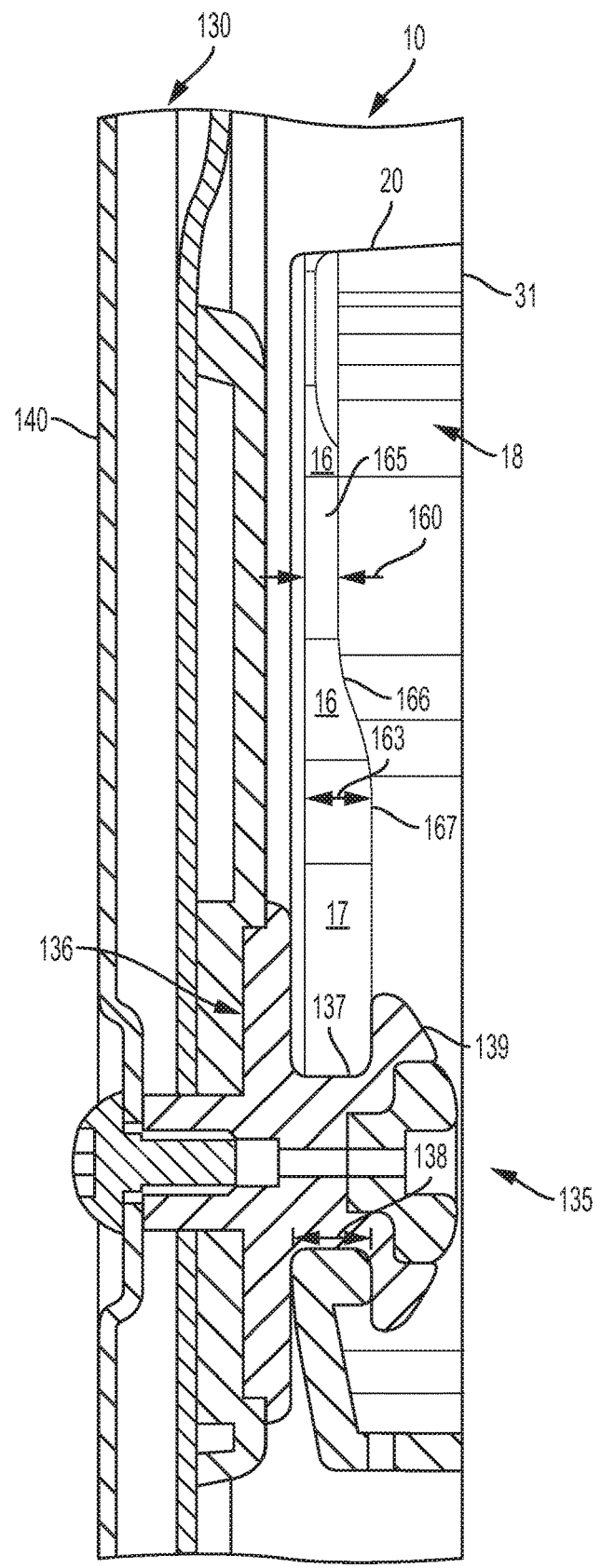
FIG. 23 depicts a cross-section view of an insert coupled to the mounting receptacle according to one or more embodiments shown and described herein.

Referring to FIG. 21, the container 130 is shown coupled to the container mounting assembly 10 in the open position. The first half shell 140 is coupled to the first mounting plate 31 and the second half shell 143 is coupled to the second mounting plate 33. FIG. 23 illustrates the coupling of the container 130 to the container mounting assembly 10. Referring to FIG. 23, the insert 135 may slidably couple with the mounting receptacle 20 or 20'. The mounting receptacle 20 may comprise a capture area wall 165, a capture wall thickness 160, a ramp wall 166, a retention area wall 167, and a retention wall thickness 163. The insert 135 may comprise an insert plate 136 and a stem thickness 138. When the container 130 is desired to be coupled to the container mounting assembly 10, the container 130 is positioned in relation to the container mounting assembly 10 such that each insert 135 aligns with an associated mounting receptacle 20. The insert 135 is positioned within the capture area 18 of the mounting receptacle 20. The container 130 is then moved in a direction towards each vertical slot 17 such that the enlarged head portion 139 of the insert 135 is captured in each vertical slot 17. The insert plate 136 may provide a low friction surface to slidably couple the insert 135 with the one or more mounting receptacles 20.

Referring to the embodiment of FIG. 4, the downwardly tapering slot 16 center the stem portion 137 of the insert 135 on the central axis 19 as the insert 135 is transitioned from the capture area 18 to each vertical slot 17, where the capture area 18 is a portion of the vertical slot 17 that at least partially secures the insert 135 from removal from the mounting receptacle 20. Referring back to FIG. 23, the capture wall thickness 160 may be thick enough to bear the load of the container 130 should the container 130 become jammed or lodged in the capture area 18 but thin enough to allow the enlarged head portion 139 to move between (i.e., the freedom to move in 3 dimensions), in this example, the first mounting plate 31 and the downwardly tapering slot 16. As the insert 135 is transitioned from the capture area 18 and each vertical slot 17, the ramp wall 166 transitions in thickness between the capture wall thickness 160 and the retention wall thickness 163. The retention wall thickness 163 is thick enough to capture the enlarged head portion 139 between the mounting receptacle 20 and, in this example, the first mounting plate 31. The capture of the enlarged head portion 139 serves to reduce or prevent the container 130 from moving in relation to the container mounting assembly 10. The reduction or prevention of movement also serves to reduce any rattling between the container mounting assembly 10 and the container 130 due to vibrations or other oscillatory forces when either the structure that the container mounting assembly 10 is secured to or the container 130 has a force exerted upon it. It should be noted, in another example, the retention wall thickness 163 is thick enough to capture the enlarged head portion 139 between the mounting receptacle 20 and a plate of the one or more mounting plates 30.

Figure 22:
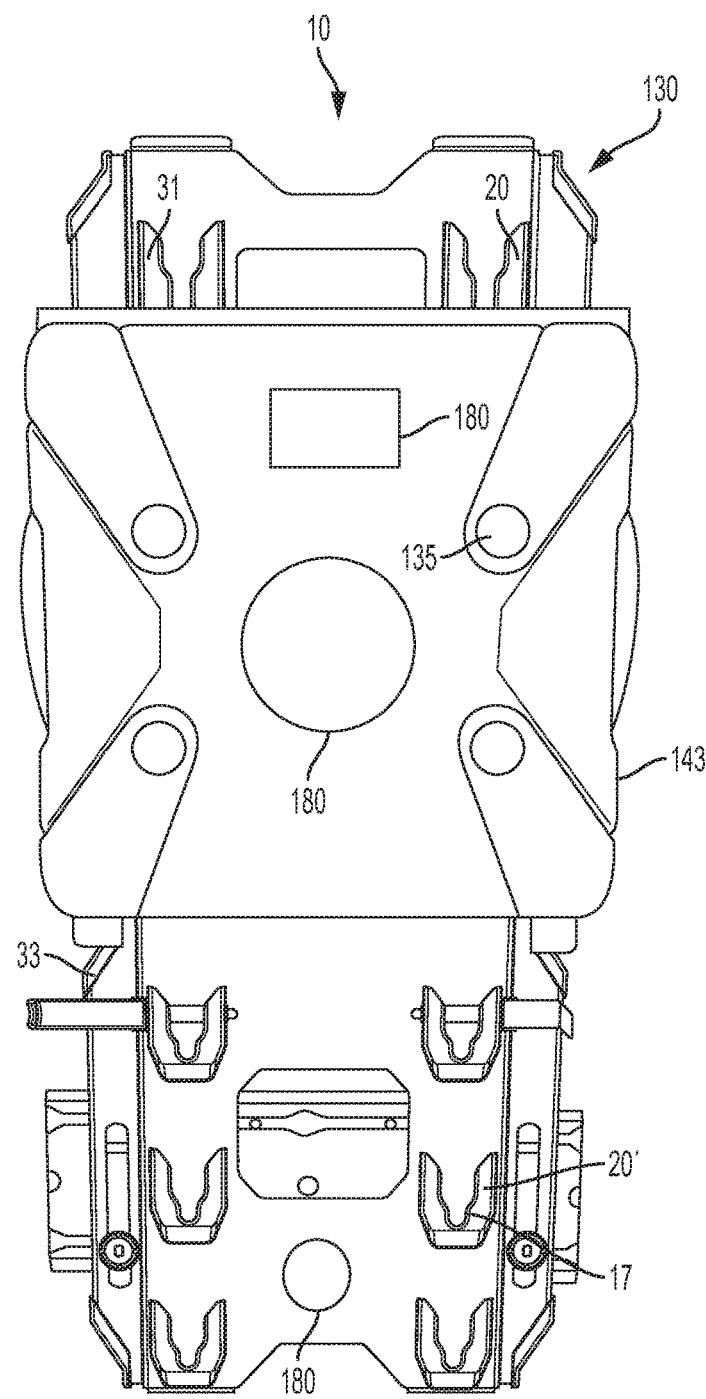
FIG. 22 depicts a front view of the container coupled to the container mounting assembly according to one or more embodiments shown and described herein.

The embodiment of FIG. 22 depicts a front view of the container 130 coupled to the container mounting assembly 10. As discussed hereinabove, in relation to FIG. 4, the one or more mounting receptacles 20 have a longer insert length s than the s' of the one or more mounting receptacles 20'. In FIG. 22, the one or more mounting receptacles 20 are coupled to the first mounting plate 31 and the one or more mounting receptacles 20' are coupled to the second mounting plate 33. When the container 130 is transitioned to the open position while coupled to the first mounting plate 31 as shown, each insert 135 on the second half shell 143 will align with each vertical slot 17 of the one or more mounting receptacles 20' on the second mounting plate 33. The shorter capture area length s' allows a user to lift the second half shell 143 and introduce each insert 135 into each capture area 18 of the one or more mounting receptacles 20'. The second half shell 143 is then lowered until the inserts 135 of the second half shell 143 are captured in each vertical slot 17. It should be understood, that the discussion hereinabove, in relation to the one or more mounting receptacles 20 and 20' are applicable to the one or more mounting receptacles 20 and 20'. The difference in the capture area lengths s and s' is because if, for example, the capture area length s' were about equal to the capture area length s on the mounting receptacles 20 on the first mounting plate 31, a user could potentially uncouple the first half shell 140 from the first mounting plate 31 while lifting the second half shell 143 into position with the mounting receptacles 20'. In other words, the long insert length s allows a user to couple the second half shell 143 to the second mounting plate 33 without uncoupling the first half shell 140 from the first mounting plate 31.

Still referring to FIG. 22, in one embodiment the container 130 and the container mounting assembly 10 may comprise one or more label areas 180. Each label area may comprise a color code or text to indicate the either the contents of the container 130 or to match a specific container 130 to a container mounting assembly 10.

Referring back to FIG. 1, the container mounting assembly 10 may include one or more impact areas 170. The one or more impact areas 170 may be made from rubber or the like. The one or more impact areas 170 are positioned at a plurality of corner areas of each plate of the one or more mounting plates 30 of the container mounting assembly 10. The one or more impact areas 170 may be used to absorb the force of an impact on the plurality of corner areas. The one or more impact areas 170 may also serve as slip-resistant gripping areas to aid in mounting and dismounting the container mounting assembly 10 from one or more track members 100 or for transport in the folded position as described hereinbefore.

The container mounting assembly 10 may include one or more apertures 175 to reduce the weight of the container mounting assembly 10. The one or more apertures 175 may also aid in aligning the container mounting assembly 10 to the one or more track members 100. The container mounting assembly 10 may also include a single mounting plate 30 or three or more mounting plates 30. For example, and not limited to, the container 130 (FIG. 19) may include side pouches (not shown) or may open horizontally as opposed to vertically as shown in FIG. 22. The container mounting assembly 10 may accommodate different container 130 configurations by positioning the one or more mounting plates 30 on the one or more track members 100 where the container 130 half shells and/or pouches, etc., are located when fully open.

In one embodiment, a single mounting plate 30 container mounting assembly 10 may be used to secure the first half shell 140 (FIG. 21) to the one or more track members 100. The second half shell 143 may have, instead of inserts 135, one or more wedge interfaces as shown and described in PCT/US2014/050392. A wedge mount, as shown and described in PCT/US2014/050392, may be coupled to the one or more track members 100 and configured to secure the second half shell 143 to the structure (building or vehicle). In another embodiment, one or more track clips may be used to secure the second half shell 143 to the structure. The modularity of this system (including the disclosures of PCT/US2014/050392 and PCT/US2014/050288 which is herein incorporated by reference in its entirety) is vast and all combinations are contemplated.

Referring now to FIGS. 8, 17, and 18, in some embodiments the container mounting assembly 10 may comprise one or more tabs 80. The one or more tabs 80 may reduce or prevent a foreign object from getting between the container mounting assembly 10 and the structure 150 (FIG. 9). When the container mounting assembly 10 is coupled to the one or more track members 100, one of the one or more tabs 80 may contact one of the one or more track members 100 and exert a contact force which serves to reduce or prevent motion of the one or more mounting plates 30 of the container mounting assembly 10 in relation to each track member 100.

Referring generally to FIGS. 1 and 16, the container mounting assembly 10 provides the ability to quickly mount a container to a building structure or structure of a vehicle. The hinge 35 allows the container mounting assembly 10 to adjust to any contours or non-planar structures. The combination of the upper track locks 110 and the lower track locks 115 allows a user to secure one mounting plate first before securing another mounting plate.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Certain terminology is used in the disclosure for convenience only and is not limiting. The words "left", "right", "front", "back", "upper", and "lower" designate directions in the drawings to which reference is made. The terminology includes the words noted above as well as derivatives thereof and words of similar import.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A container mounting assembly comprising:
   a first mounting plate and a second mounting plate, wherein each of the first mounting plate and the second mounting plate comprises a track engagement surface and a container mounting surface opposite the track engagement surface, the first mounting plate coupled to the second mounting plate and one or more plate securing members, the one or more plate securing members comprise a bump stop and a set screw, such that the one or more plate securing members restrain movement of the first mounting plate in relation to the second mounting plate;
   a plurality of track engagement members outwardly extending from the track engagement surface, the track engagement members being configured to engage one or more track slots of a track member;
   a plurality of mounting receptacles spaced and outwardly extending from the container mounting surface, each mounting receptacle comprising at least one vertical slot for receiving an insert of a container; and
   a retention locking member, the retention locking member comprises a first handle, a second handle, a locking bar and one or more locking blocks;
   the retention locking member cooperative with the plurality of mounting receptacles to allow the at least one vertical slot to receive and selectively secure the container to the container mounting assembly irrespective of whether the first mounting plate and the second mounting plate are in an open position or a folded position.

2. The container mounting assembly of claim 1, wherein the first mounting plate and the second mounting plate are coupled by one or more hinges.

3. The container mounting assembly of claim 1, wherein at least one of the mounting receptacles comprises at least one retention lock cavity.

4. The container mounting assembly of claim 3, wherein the retention lock cavity extends perpendicular to the vertical slot.

5. The container mounting assembly of claim 3, wherein the retention lock cavity is horizontally disposed at an upper edge of one of the mounting receptacles.

6. The container mounting assembly of claim 3, wherein the is a locking bar operable to slide horizontally within the retention lock cavity to secure the container.

7. The container mounting assembly of claim 6, wherein the locking bar is located in the retention lock cavity when the retention locking member is in a locked position.

8. The container mounting assembly of claim 1, wherein the vertical slot of the mounting receptacles is a downwardly tapering slot, the downwardly tapering slot having a greater width at an upper section and a smaller width at a lower section.

9. The container mounting assembly of claim 8, wherein the insert of the container has a flanged end, the flanged end having a diameter smaller than the width of the upper section of the downwardly tapering slot and greater than the width of the lower section of the downwardly tapering slot.

10. The container mounting assembly of claim 1, wherein the plurality of mounting receptacles are arranged on the container mounting surface in a plurality of rows, a plurality of columns, or both.

11. The container mounting assembly of claim 1, wherein the track engagement members comprise one or more locking pins operable to engage one or more track slots of the track member, wherein the one or more locking pins are coupled to and outwardly extending from the track engagement surface of the first mounting plate or the second mounting plate.

12. The container mounting assembly of claim 1, wherein the track engagement members comprise one or more fixed track locks having an engagement head coupled with an engagement body, the engagement head being operable to slidingly engage one or more track slots of the track member, wherein the one or more fixed track locks are coupled to and outwardly extending from the track engagement surface of the first mounting plate or the second mounting plate.

13. The container mounting assembly of claim 1, wherein the track engagement members comprise one or more sliding track locks having an engagement head coupled with an engagement body, the engagement head being operable to slidingly engage one or more track slots of the track member, wherein the one or more sliding track locks are slidably coupled to and outwardly extending from the track lock guide of the track engagement surface of the first mounting plate or the second mounting plate.

14. The container mounting assembly of claim 13, wherein the one or more sliding track locks comprise a rotational track lock that tightens or loosens the container mounting assembly to the track by rotating a knob.

15. A container assembly comprising at least one track member mounted on a vertical support, a container mounting assembly mounted to at least one track member, and a container mounted to the container mounting assembly wherein:
the container mounting assembly comprises:
a first mounting plate and a second mounting plate, wherein each of the first mounting plate and the second mounting plate comprises a track engagement surface and a container mounting surface opposite the track engagement surface, the first mounting plate pivotally coupled to the second mounting plate and one or more plate securing members, the one or more plate securing members comprise a bump stop and a set screw, such that the one or more plate securing members restrain movement of the first mounting plate in relation to the second mounting plate;
a plurality of track engagement members outwardly extending from the track engagement surface, the track engagement members engaging one or more track slots of the track member;
a plurality of mounting receptacles spaced and outwardly extending from the container mounting surface, each mounting receptacle comprising at least one vertical slot; and
a retention locking member comprising a first handle, a second handle, a locking bar and one or more locking blocks;
the retention locking member cooperative with the plurality of mounting receptacles to allow the at least one vertical slot to receive and selectively secure the container to the container mounting assembly irrespective of whether the first mounting plate and the second mounting plate are in an open position or a folded position;
the container comprises:
two exterior shell sections coupled together, and one or more inserts extending outwardly from at least one of the exterior shell sections, wherein the one or more inserts engage the vertical slot of the container mounting assembly while the retention locking member secures the container to the container mounting surface.

16. The container assembly of claim 15, wherein the vertical slot of the mounting receptacles is a downwardly tapering slot, the downwardly tapering slot having a greater width at an upper section and a smaller width at a lower section.

17. The container assembly of claim 16, wherein the insert of the container has a flanged end, the flanged end having a diameter smaller than the width of the upper section of the downwardly tapering slot and greater than the width of the lower section of the downwardly tapering slot.

18. The container mounting assembly of claim 1, wherein the one or more locking blocks comprise at least one roller, the at least one roller aids in transitioning of the retention locking member between a locked position and an unlocked position.

19. The container assembly of claim 15, wherein the one or more locking blocks comprise at least one roller, the at least one roller aids in transitioning of the retention locking member between a locked position and an unlocked position.

* * * * *